Patented Dec. 2, 1941

2,264,774

UNITED STATES PATENT OFFICE 2,264,774

PROCESS FOR PRODUCING TERPENE POLYMERS

William E. Sheehan, Coraopolis, Pa., assignor to The Neville Company, Pittsburgh, Pa., a corporation of Pennsylvania No Drawing. Application August 28, 1940, Serial No. 354,585

17 Claims. (Cl. 260—80)

This invention relates to the production of polymers, especially polymers of resinous nature, and more particularly to the production of terpene polymers.

It has been proposed heretofore to produce polymers of polymerizable materials by treating the latter with halide polymerization catalysts, particularly the metallic halides. This class of polymerization catalysts is well known in the art and various members of it have been used, but for the practice of my invention, anhydrous aluminum chloride is preferred.

Such procedures as proposed and practiced heretofore have been subject to various troubles and disadvantages which have militated against their adoption or more widespread use. For example, hydration of aluminum chloride, as during polymerization or in the succeeding treatment of the polymerized material causes corrosion of the equipment, and in some instances this is encountered also or enhanced by acid used in the purification of the polymers. Hence to combat corrosion it has been necessary in the practice of such procedures to construct the equipment from special corrosion-resistant materials, with attendant increased overhead cost.

Also, a commonly encountered difficulty is the formation, during purification of the polymerized material, of emulsions which are difficult to break, due, apparently, to hydration of aluminum chloride with formation of the hydroxide. This troublesome occurrence impedes separation of the polymerized oil and the aqueous purifying phase, thus slowing up the operations with increase in operating costs.

Moreover, it has been difficult in some instances to completely free the polymers from aluminum compounds due, presumably, to formation of complexes or compounds with the polymer or the unsaturate from which it is formed. For many purposes the presence of such inorganic matter in the polymers is undesirable and reduces their market value, for example because it renders them unstable or causes corrosion in using or treating the polymer.

Another disadvantage of such procedures arises from the powerful polymerizing effect of aluminum chloride, which tends to cause rapid and substantial temperature surges. This is undesirable not only because the reaction may become so violent as to get out of control, but also because such elevated temperatures may result in reduced yields of resin or the production of polymers of inferior character. Because of this it has generally been necessary heretofore to provide cooling means for the purpose of controlling the reaction, but this is undesirable from the production standpoint because by such refrigeration the rate of reaction is reduced and considerable periods of time may be necessary to carry the polymerization to a desired degree.

It is among the objects of this invention to provide a process of producing polymers using aluminum chloride, which is simple, readily practiced and produces polymers of satisfactory quality, in which corrosion difficulties are repressed or substantially overcome, in which separation of the catalyst and its decomposition or reaction products is simple, complete and effected without emulsification, which may be effected rapidly and, if desired, without the application of artificial cooling, and which generally overcomes the disadvantages heretofore encountered in the production of polymers using this catalyst.

A further object is to provide a process of producing terpene polymers which eliminates the foregoing disadvantages.

Other objects will be understood from the following description.

The term "terpene polymers" used herein has reference to the polymers produced by the treatment of gum turpentine or of pure polymerizable terpenes such, for example, as fractions or mixtures of fractions of gum turpentine, e. g., those of which from about 5 to 95 per cent by volume distill at from about 154° to 187° C. Various examples of such terpenes or fractions will appear in the following examples and will adequately identify this well-recognized class of organic materials.

In the practice of the invention the terpene material is mixed with an inert aliphatic diluent, preferably one of the well known petroleum solvents, and most suitably petroleum benzine. The polymerization is then conducted in the presence of aluminum chloride as the polymerization catalyst, after which the polymerized oil, i. e., solution of polymers and unreacted material, is separated from the sludge, which largely comprises spent catalyst. The polymerized oil is then treated with an alkaline material to decompose free residual aluminum chloride, and possibly some portion of catalyst complexes or other compounds, termed herein as catalyst products, most suitably by soda. The polymerized oil and the aqueous caustic solution are then separated from each other to recover the former which may be washed with water to remove any residue of alkaline material. In this condition most of the products resulting from the aluminum chloride have been removed but the polymerized oil still contains some proportion of aluminum complexes or catalyst reaction products.

I have discovered, and it is upon this that my invention is in large part predicated, that the remainder of the catalyst products may be removed easily and simply from the polymerized oil by subjecting it to partial distillation. Accordingly, the alkali-treated and washed polymerized oil is then heated to distill off only a portion of the inert diluent which may be accompanied, of course, by some proportion of other materials that may be present and which boil below the desired polymers. This treatment causes the residual aluminum compounds to be precipitated completely as alumina in a form which is easily separated, as by simple filtration. It appears that as a result of the partial distillation the aluminum compound, as hydroxide or other compound that may be present, is in some manner dehydrated so that not only is the alumina completely precipitated, but also it is in a form which does not produce emulsions. After the aluminum compound has been thrown out of solution it is filtered from the polymerized oil which is then treated to recover the polymers, suitably by distillation to remove the inert diluent and unpolymerized material with recovery of the polymers.

Various and substantial advantages attend the practice of the invention as thus described. I have discovered, for example, that by the use of a sufficienetly high ratio of inert diluent to terpene the reaction will proceed rapidly but without surging of the temperature of the reaction body to an undesirable degree. Thereby the use of cooling during the reaction becomes unnecessary while, on the other hand, the reaction proceeds at temperatures such that it is completed in relatively short times. Thus, such use of an inert diluent in accordance with the present invention renders possible the use of less elaborate apparatus, requires less observation and control, and permits more rapid production than prior art processes of this general nature. In the polymerization of terpenes I have found that satisfactory results are to be had by the use of from about four to six volumes of petroleum benzine to one volume of terpene. Using such proportions there is no undue temperature rise although the temperature rise obtained causes the reaction to be completed rapidly and with production of polymers having desirable properties. Other proportions of diluent and terpene may be used, of course, if desired for special purposes. For instance, if the use of refrigeration is not undesirable, the reaction may be carried out in solutions of the terpene in inert diluent which contain higher proportions of terpene, followed by the addition of sufficient petroleum benzine or the like to give a ratio of from four to six volumes of total diluent to one volume of terpene.

Another advantage is that in the invention as thus practiced relatively slight amounts of sludge are formed, and, as the petroleum solvents are relatively non-solvent for aluminum chloride and of low density as compared with other diluents commonly used, settling of this sludge is promoted rapidly, quickly and cleanly and with negligible loss of polymer adhered thereto. Coupled with this rapid separation, the sludge formed has been found to be sufficiently cohesive as to permit clean decantation of the polymerized oil. Thus the separation from sludge is expedited and the subsequent steps are simplified because of the removal of substantially the whole of the spent catalyst prior to the following purification steps.

Major advantages arise also from elimination or substantial reduction of corrosion due to the catalyst. The invention provides that as long as the solution is acid it remains anhydrous so that there is minimized tendency for corrosion of the equipment during polymerization. Subsequently, when aqueous solutions are introduced, the mixture is made definitely alkaline, in which condition there is little or no tendency for corrosion of the equipment usually used for such purposes. This is in contrast with one type of procedure commonly used heretofore of washing with dilute hydrochloric acid, in which special corrosion-resistant apparatus is required. Another common procedure is to steam the polymer oil upon the introduction of alkali, thus adding a step and increasing the tendency to form emulsions which may be difficult to treat. Such steaming is unnecessary in the practice of this invention. Furthermore, it has been proposed to use organic hydroxy compounds for decomposition of residual catalyst such, for example, as methyl or ethyl alcohol, or ammoniacal solutions thereof. As compared with the readily available and cheap aqueous alkalies used in the practice of the present invention, such hydroxy compounds are expensive.

As indicated hereinabove, a particularly important result of the present invention, which is of especial importance to the economics of the process, is the easy, rapid and complete separation from the alkali-washed oil of all of the residual catalyst or catalyst products in a readily removable form and without the formation of emulsions, whereby the polymers are not only recovered in a form free from inorganic matter resulting from the catalyst, but also are recovered more simply, more rapidly and more cheaply than in accordance with processes heretofore proposed.

Advantages accrue from the use of petroleum solvents, especially petroleum benzine, because the terpene polymers are soluble therein in substantially all proportions. Consequently the resin is not precipitated during the purification steps, thus simplifying the practice and reducing losses which may occur otherwise.

The invention may be described with further reference to the following examples.

*Example 1.*—A mixture of 100 ml. of beta pinene and 600 ml. of petroleum benzine was mechanically stirred at 15° C. while adding 8.7 grams of anhydrous aluminum chloride. In thirty seconds the temperature rose to 73° C. maximum, after which it fell off gradually. Seven minutes after the addition of the catalyst the reaction was complete. The polymerized oil was decanted from the sludge, which settled rapidly, and was then agitated with 70 ml. of a 10 per cent solution of caustic soda in water until the oil had lost its original red brown color and assumed a pale yellow color. The mixture was then allowed to stratify with production of a clear break between the oil and the aqueous layer. No emulsion formed. The caustic solution was then drained away and the oil was washed twice with 70 ml. portions of water. The decanted oil was then placed in a distilling flask and heated, and as distillation proceeded the oil became clouded with precipitated alumina. The oil was then removed from the flask and filtered, and the clear filtrate was then distilled to remove the diluent. In this way there was recovered a clear, pale yellow, hard and brittle resin of about 150° C. melting point.

*Example 2.*—To a mixture of 15.4 gallons of petroleum benzine and 9733 ml. of beta pinene there were added 847 grams of anhydrous aluminum chloride, the whole being subjected to rapid mechanical agitation. The reaction was complete in thirty-six minutes during which time the temperature had risen to a maximum of 65° C. After it had reached its maximum temperature the reaction body was cooled to 36° C. by applying water cooling. The reaction liquid was then allowed to stand quiescent for separation of the sludge, and after thirty minutes the oil was decanted therefrom and washed during two hours with 9733 ml. of a 10 per cent aqueous solution of caustic soda. At the end of that time agitation was discontinued and the mixture settled for thirty minutes after which the aqueous layer and the polymerized oil were separated easily, there being no emulsion formed. The oil was then washed three times with separate portions of water each amounting to 10 per cent by volume of the oil. The washed oil was then placed in a still and 10 per cent of its volume was distilled off during the course of which the alumina in the oil was completely precipitated. The residue in the still was then filtered to remove the alumina and the filtrate was again distilled to remove all of the diluent, after which it was steam-distilled to remove traces of oil and harden the resin. The recovered resin amounted to 88.2 per cent by weight of the beta pinene charged, it had a melting point of 148° C., and its color was 1 on the resin color standard scale of The Neville Company, Pittsburgh, Pennsylvania.

*Example 3.*—200 grams of alpha pinene (from gum turpentine) were polymerized in the manner described in the foregoing examples. In this case it was found necessary to raise the temperature of the reaction mixture to initiate reaction. The reaction range was essentially from 65° to 85° C. The polymers recovered were in the form of a clear pale, medium hard resin of 86° C. melting point and of ½ color on the scale referred to, together with a pale amber-colored oil. The resin amounted to 9.3 per cent by weight, and the oil 28.3 per cent by weight, of the original alpha pinene charged, giving a total polymer yield of 37.6 per cent.

*Example 4.*—200 grams of dipentene were polymerized following the general method of the foregoing examples. There was recovered a clear resin of ¾ color on the foregoing scale which had a melting point of 98° C. There was recovered also a somewhat viscous oil polymer of pale amber color. The resin amounted to 26.9 per cent and the oil to 23.8 per cent by weight of the dipentene charged.

*Example 5.*—200 grams of technical d-limonene were polymerized in the foregoing manner. There was recovered a clear resin, amounting to about 15 per cent by weight of the d-limonene, which was pale amber in color and of 127° C. melting point.

*Example 6.*—In this test 200 grams of gum turpentine were polymerized in the manner described in the foregoing examples. The resin recovered was clear pale yellow in color, of 143° C. melting point, and amounted to 37.5 per cent of the original gum turpentine.

As indicated above, a desirable feature of the invention is that by the use of an inert diluent in sufficient amount the polymerization may be completed rapidly, without undue temperature rise and without the application of artificial cooling means. In the practice of the invention in that manner, at least as applied to terpenes, it is desirable that the concentration of the polymerizable material be such that for the given rate of adding the catalyst the mixture does not attain a temperature above about 85° C. For some purposes it is desirable, moreover, that after the maximum temperature has been attained the reaction body be cooled somewhat, say to 50° C., and the reaction then permitted to go to completion.

As also indicated above, higher concentrations of the polymerizable material may be used provided undesirable temperature surges be avoided by the use of refrigeration. However by the practice of a modification the polymerization using a high diluent-to-terpene ratio as taught by this invention, it has been found that low reaction temperatures may be maintained without the necessity of resorting to elaborate refrigeration of the reaction body. For instance, the catalyst may be added to a mixture of the inert diluent and a portion of the polymerizable material which is to be treated, the remainder of the polymerizable material being added subsequently, either all at once or in a plurality of fractions. In this modification, cooling is employed only to return the reaction mass to about its initial temperature after the temperature surge resulting from the reaction has spent itself and reached a maximum. The initial amount of the terpene admixed with the diluent and the added increments are proportioned so that the maximum temperature does not exceed about 35° to 45° C. Such a practice is exemplified by the following example.

*Example 7.*—In this test there were charged into the polymerizing vessel 1380 ml. of petroleum benzine and 50 grams of betal pinene. With the mixture under agitation there were added 10 grams of anhydrous aluminum chloride. The remainder of the pinene was added and cooling was applied as shown in the following tabulation:

| Time | Temperature | Remarks |
| --- | --- | --- |
| | °C. | |
| 0 | 16 | Aluminum chloride added with agitation on. |
| 1 min | 19 | |
| 2 min | 31 | |
| 3 min | 32 | Max. cooling water on. |
| 8 min | 20 | 50 gms. pinene added. Cooling water off. |
| 9 min | 36 | |
| 9½ min | 36½ | Max. cooling water on. |
| 15 min | 20 | 50 gms. pinene added. Cooling water off. |
| 16 min | 34 | |
| 17 min | 36 | Max. cooling water on. |
| 23 min | 20 | 50 gms. pinene added. Cooling water off. |
| 24 min | 31 | |
| 25 min | 35 | Max. cooling water on. |

The polymerized oil was settled, decanted, caustic-washed, water-washed, dehydrated by partial distillation, filtered, and distilled to recover the resin. The total beta pinene used was 200 grams, and there were recovered 181.5 grams, or 90.6 per cent by weight of the pinene charged, of resin of 151° C. melting point and of a color of ½ on the color scale referred to above. In this test the sum of the incremental temperature rises following each addition of beta pinene closely approaches the maxima by the practice of Examples 1 and 2 but, as will be observed, without the actual attainment of the maximum temperatures of those experiments. This results in excellent control and freedom from possible ill effects of elevated reaction temperatures, for which reason practice in accordance with this aspect of the invention may be desirable in the production of polymers which are sensitive to elevated temperatures, or for other reasons.

In the foregoing tests the petroleum benzine used was of 0.726 specific gravity and its boiling range was 85° to 135° C.

According to the provisions of the patent statutes, I have explained the principle and method of practicing my invention, and have described what I now consider to represent its best embodiment. However, I desire to have it understood that, within the scope of the appended claims, the invention may be practiced otherwise than as specifically described.

I claim:

1. In a process of polymerizing a polymerizable terpene with aluminum chloride in the presence of an inert aliphatic diluent, the combination of steps comprising separating the polymerized solution from sludge, neutralizing the sludge-free oil with an alkaline solution, separating the neutralized oil from the alkaline solution, and heating the neutralized solution to effect partial distillation of said diluent and precipitate residual catalyst and its products, separating the neutralized solution from precipitated residual catalyst.

2. In the polymerization of a polymerizable terpene with aluminum chloride in the presence of an inert aliphatic diluent, the combination of steps comprising separating the polymerized solution from sludge, treating the sludge-free oil with an aqueous caustic solution to neutralize it, separating the neutralized oil from the alkaline solution, heating the neutralized solution and partially distilling said diluent to effect dehydration and precipitate residual catalyst compound, and filtering the solution to separate precipitated catalyst therefrom and produce a clear polymerized oil solution free from mineral acid, water and catalyst products.

3. In the polymerization of a polymerizable terpene with aluminum chloride in the presence of an inert aliphatic diluent, the combination of steps comprising decanting the polymerized solution from sludge, neutralizing the sludge-free oil with an aqueous alkali solution, separating said alkali solution from the neutralized solution, water washing the neutralized solution to remove residual alkali, heating the washed and neutralized solution to partially distill said diluent, dehydrate the solution, and precipitate residual catalyst, filtering the dry residual solution to produce a clear polymerized oil solution, and distilling and steaming said clear solution to separate and recover the polymer.

4. A process according to claim 2, said terpene being gum turpentine.

5. A process according to claim 2, said terpene being beta pinene.

6. A process according to claim 3, said terpene being beta pinene, and said diluent being petroleum benzine.

7. In the polymerization of a polymerizable terpene with aluminum chloride, the steps comprising providing a solution of said terpene in petroleum benzine, adding said catalyst and effecting polymerization of said terpene, the concentration of said terpene being such that without artificial cooling the maximum temperature due to reaction surge does not exceed about 85° C., separating the polymerized solution from sludge, treating the sludge-free oil with an aqueous alkali solution, separating the neutralized oil from the alkaline solution, heating the neutralized solution to partially distill said diluent and cause precipitation of residual catalyst material, filtering the residual solution to separate precipitated catalyst therefrom and then distilling said diluent to recover said resin.

8. In the polymerization of a polymerizable terpene with aluminum chloride, the steps comprising providing a solution of said terpene in petroleum benzine, adding said catalyst and effecting polymerization of said terpene, the concentration of said terpene being such that without artificial cooling the maximum temperature due to reaction surge does not exceed about 85° C., then cooling to about 50° C. and completing the reaction at about 40 to 50° C., separating the polymerized solution from sludge, treating the sludge-free oil with an aqueous caustic soda solution, separating the neutralized oil from the alkaline solution, partially distilling the neutralized solution to dehydrate it and cause precipitation of residual catalyst material, filtering the residual solution to separate precipitated catalyst therefrom, and then distilling the solution to recover said resin.

9. In a polymerization of polymerizable terpenes with aluminum chloride, the steps comprising providing a solution of one volume of said terpene in four to six volumes of petroleum benzine, adding said catalyst and effecting polymerization of said terpene, separating the polymerized solution from sludge, neutralizing the sludge-free oil with an aqueous caustic soda solution, then water washing to remove residual alkali and recovering the washed solution, heating the washed solution to partially distill said diluent and cause precipitation of residual catalyst material, filtering the residual solution to separate precipitated catalyst therefrom, and then distilling said diluent to recover said resin.

10. That method of producing terpene polymers by polymerization with metallic halide polymerization catalyst which comprises providing a solution of a portion of the terpene to be polymerized in an inert diluent, adding said catalyst to said solution, permitting the reaction surge due to polymerization to proceed to substantially a maximum temperature, cooling the body to about its initial temperature, then adding the remainder of the terpene to be polymerized in one or more fractions during which the reaction surge due to polymerization is allowed to proceed as before, the amounts of terpene present initially and added as increments being such as to limit the maximum temperature in the reaction body during reaction to not over about 35° to 45° C.

11. A process according to claim 10, said catalyst being aluminum chloride, and said diluent being petroleum benzine.

12. A process according to claim 10, said terpene being beta pinene.

13. In a process of polymerizing a polymerizable terpene with aluminum chloride in the presence of an inert diluent whose volume is approximately that of said terpene, the method of purifying the polymers which comprises diluting the reaction mass with an inert aliphatic diluent in an amount such that the total diluent volume is four to six times that of said terpene, then settling sludge and decanting the sludge-free solution therefrom, neutralizing the solution with aqueous caustic solution, separating the neutralized oil from the solution, partially distilling the neutralized solution to dehydrate it and precipitate residual catalyst products, and filtering to produce a clear polymer solution free from mineral acid, water and catalyst products.

14. A process according to claim 13, said terpene being beta pinene.

15. A process according to claim 2, said terpene being a fraction of gum turpentine boiling between 154° and 187° C., and said alkali being caustic soda.

16. A process according to claim 9, said terpene being a fraction of gum turpentine boiling between about 154° and 187° C.

17. A process according to claim 13, said terpene being a fraction of gum turpentine boiling between about 154° and 187° C.

WILLIAM E. SHEEHAN.